United States Patent
Kocic (10) Patent No.: US 12,504,271 B2
(45) Date of Patent: *Dec. 23, 2025

(54) CMM DOWNTIME SYSTEM

(71) Applicant: Hexagon Metrology, Inc., North Kingstown, RI (US)

(72) Inventor: Milan Kocic, Pawtucket, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,801

(22) Filed: Jun. 12, 2024

(65) Prior Publication Data

US 2024/0328774 A1 Oct. 3, 2024

Related U.S. Application Data

(63) Continuation of application No. 17/518,405, filed on Nov. 3, 2021, now Pat. No. 12,055,376.

(51) Int. Cl.
 *G01B 11/00* (2006.01)
 *G06N 3/02* (2006.01)
 *G06V 20/10* (2022.01)
 *G06V 40/10* (2022.01)

(52) U.S. Cl.
 CPC ............. *G01B 11/005* (2013.01); *G06N 3/02* (2013.01); *G06V 20/10* (2022.01); *G06V 40/10* (2022.01)

(58) Field of Classification Search
 CPC ...... G01B 11/005; G01B 21/047; G06N 3/02; G06V 20/10; G06V 40/10
 USPC .................................................. 356/614–625
 See application file for complete search history.

(56) References Cited

U.S. PATENT DOCUMENTS

| | | | |
|---|---|---|---|
| 2015/0049186 A1* | 2/2015 | Pettersson | G06F 3/0304 348/135 |
| 2015/0285616 A1* | 10/2015 | Jordil | H04N 7/18 33/503 |
| 2016/0327383 A1* | 11/2016 | Becker | G01B 11/25 |
| 2016/0349034 A1* | 12/2016 | Cobb | G01B 11/005 |
| 2018/0058840 A1* | 3/2018 | Lamendola | G01B 11/2504 |
| 2023/0099779 A1* | 3/2023 | Redgewell | G01S 17/66 356/614 |

FOREIGN PATENT DOCUMENTS

WO WO-2021069079 A1 * 4/2021 ........... G01B 11/005

* cited by examiner

*Primary Examiner* — Isiaka O Akanbi
(74) *Attorney, Agent, or Firm* — Nutter McClennen & Fish LLP (57) ABSTRACT

Various embodiments enable automation of non-production activities of a coordinate measuring machine by ascertaining, prior to executing such activities, that such activities could be safely executed in the machine's environment. Although making such a determination can be fully automated, some embodiments include a human decision-maker in the loop.

20 Claims, 7 Drawing Sheets

CMM DOWNTIME SYSTEM

RELATED APPLICATIONS

This application is a continuation application from U.S. non-provisional application Ser. No. 17/518,405, filed Nov. 3, 2021 and titled "CMM Downtime System" and naming Milan Kocic as inventor.

The disclosure of each of the foregoing is incorporated herein by reference, in its entirety.

FIELD OF THE INVENTION

The invention generally relates to metrology machines, and more particularly, the invention relates to use of metrology machines.

BACKGROUND OF THE INVENTION

Coordinate measuring machines (CMMs) are the gold standard for accurately measuring a wide variety of different types of work pieces. For example, CMMs can measure critical dimensions of aircraft engine components, car engine cylinders, surgical tools, and gun barrels. Precise and accurate measurements help ensure that their underlying systems, such as an aircraft in the case of aircraft components, operate as specified.

CMMs typically have a probe extending from an arm that is movable in up to six dimensions. Many CMMs also have an adjunct device, known as a "jogbox," that enables an operator to control the CMM. For example, an operator may use a jogbox to precisely position the arm relative to an object being measured at the beginning of the measurement process.

In production environments, a CMM typically has significant downtime during which the CMM is not used to measure workpieces. Consequently, non-production activities (which may also be referred-to as non-value-added activities) are typically scheduled for non-production times, such as nights or weekends for example. Non-production activities might include changing a sensor or probe of the CMM; repairing the CMM; and/or calibrating the CMM, to name but a few examples. Undesirably, however, CMM downtime may be difficult or impossible to schedule, particularly in a production environment.

Many such non-production activities require technicians to be present to attend to the CMM, undesirably leading to loss of productivity for the technician (who could otherwise be performing other valuable tasks, or attending to personal matters that might otherwise require the technician to take time out of work), incurring extra costs such as the cost of heating and lighting a production facility during non-production times, and/or the cost of paying a technician to be present at non-production times.

It has not been possible to automate such non-production activities to occur during non-production times due to the inability for an automated CMM to ascertain that executing automated non-production activities would be safe and/or effective. For example, executing automated non-production activities to occur during non-production times would not be safe if, for example, a repair technician were repairing the CMM during such non-production times, since the repair technician could be injured by contact with the CMM's moving parts. Also, executing automated non-production activities to occur during non-production times would not be safe if, for example, a worker had left an object (e.g., a toolbox; a workpiece; a jogbox) on the CMM, since the object could be damaged and/or the CMM could be damaged by contact between the object and the CMM's moving parts. Similarly, executing automated non-production activities to occur during non-production times would not be effective if moving parts of the CMM hit a person or object while executing automated non-production activities, if such contact damages the CMM or knocks it out of calibration, or otherwise prevents the CMM from successfully completing the non-production activities.

SUMMARY OF VARIOUS EMBODIMENTS

In accordance with one embodiment, a method of operating a coordinate measuring machine disposed in an environment includes:
   ascertaining that the coordinate measuring machine is in an inactive mode;
   while the coordinate measuring machine in the inactive mode, imaging the environment using a camera to produce a first set of environment images, the camera having a field of view;
   contemporaneously with producing the first set of environmental images, ascertaining, at least in part from the first set of environment images, that there is no obstruction within the environment within the camera's field of view; and subsequent to and consequent to said ascertaining:
   controlling movable parts of the coordinate measuring machine to execute non-production activities.

In some embodiments, imaging the environment includes imaging at least the measuring space of the coordinate measuring machine and a portion of the environment around the coordinate measuring machine.

In some embodiments, ascertaining, at least in part from the first set of environment images, that there is no obstruction within the environment within the camera's field of view includes ascertaining, by automated computer analysis of the first set of environmental images, that the environment does not include a human within a specified distance of the coordinate measuring machine.

In some embodiments, ascertaining, at least in part from the first set of environment images, that there is no obstruction within the environment within the camera's field of view includes ascertaining, by automated computer analysis of the first set of environmental images, that there is no foreign object on the coordinate measuring machine.

In some embodiments, ascertaining, at least in part from the first set of environment images, that there is no obstruction within the environment within the camera's field of view includes ascertaining, by automated computer analysis of the first set of environmental images, that there is no workpiece on the coordinate measuring machine.

In some embodiments, ascertaining, at least in part from the first set of environment images, that there is no obstruction within the environment within the camera's field of view includes providing the first set of environmental images to a human operator, and ascertaining, by operator analysis of the first set of environmental images, that the environment does not include a human within a specified distance of the coordinate measuring machine.

In some embodiments, ascertaining, at least in part from the first set of environment images, that there is no obstruction within the environment within the camera's field of view includes providing the first set of environment images to a human operator, and ascertaining, by operator analysis of the first set of environment images, that there is no foreign object on the coordinate measuring machine.

In some embodiments, ascertaining, at least in part from the first set of environment images, that there is no obstruction within the environment within the camera's field of view includes providing the first set of environment images to a human operator, and ascertaining, by operator analysis of the first set of environment images, that there is no workpiece on the coordinate measuring machine.

In some embodiments, the camera is a wide-angle still-image camera.

Some embodiments further include prior to imaging at least one of the coordinate measuring machine and the environment using a camera to produce a first set of environment images, establishing the coordinate measuring machine in the inactive mode.

In some embodiments, ascertaining that the coordinate measuring machine is in an inactive mode is performed without assessing the first set of environment images.

In some embodiments, ascertaining, at least in part from the first set of environment images, that there is no obstruction within the environment within the camera's field of view includes assessing the first set of environment images with a neural network trained to determine whether an image includes an obstruction on a coordinate measuring machine.

In some embodiments, ascertaining, at least in part from the first set of environment images, that there is no obstruction within the environment within the camera's field of view includes assessing the first set of environment images with a neural network trained to determine whether a person is within the environment of a coordinate measuring machine.

In some embodiments, controlling movable parts of the coordinate measuring machine to execute non-production activities includes an activity selected from controlling movable parts of the coordinate measuring machine to execute calibration operations, repairing the coordinate measuring machine, or changing a probe.

Another embodiment includes a system including
a coordinate measuring machine disposed in an environment;
a camera having a field of view, the camera disposed so that the environment is within the field of view;
a server in operable communication with the coordinate measuring machine and in operable communication with the camera, the server configured:
to ascertain that the coordinate measuring machine is in an inactive mode;
to receive from the camera a set of digital images of the environment;
contemporaneously with receipt of the set of digital images, to ascertain, at least in part from the first set of environment images, that there is no obstruction within the environment within the camera's field of view; and subsequent to and consequent to said ascertaining
to control movable parts of the coordinate measuring machine to execute non-production activities.

In some embodiments, the server is further configured to cause the camera to acquire the set of digital images.

In some embodiments, the camera disposed so that the coordinate measuring machine is within the field of view and at least one image from the set of digital images include the coordinate measuring machine.

In some embodiments, the server is further configured to ascertain that the coordinate measuring machine is in an inactive mode prior to receipt of the set of digital images.

Another embodiment includes a non-transient computer programmed product having non-transient computer-executable instructions stored thereon, which computer-executable instructions when executed by a computer cause the computer to perform a method relating to a coordinate measurement machine, the method including:
ascertaining that the coordinate measuring machine is in an inactive mode;
while the coordinate measuring machine in the inactive mode, imaging the environment using a camera to produce a first set of environment images, the camera having a field of view;
contemporaneously with producing the first set of environmental images, ascertaining, at least in part from the first set of environment images, that there is no obstruction within the environment within the camera's field of view; and subsequent to and consequent to said ascertaining:
causing movable parts of the coordinate measuring machine to execute non-production activities.

In some embodiments, ascertaining, at least in part from the first set of environment images, that there is no obstruction within the environment within the camera's field of view, includes ascertaining, by automated computer analysis of the first set of environmental images, that there is no workpiece on the coordinate measuring machine.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Various embodiments improve the operation of a coordinate measuring machine by disabling automated operation of the coordinate measuring machine when an obstruction is present within the coordinate measuring machine's environment. Such embodiments are improvements over prior art coordinate measuring machine systems because, unlike illustrative embodiments, operation of such coordinate measuring machine systems required a human attendant to be present even when the coordinate measuring machine was not being operated for production purposes.

Definitions: As used in this description and the accompanying claims, the following terms shall have the meanings indicated, unless the context otherwise requires.

The term "contemporaneous" (or "contemporaneously") with regard to evaluating an environment image means within a timespan (e.g., a pre-determined timespan) such that it is unlikely that an obstruction would become present after the environmental image was captured or produced, and before completion of evaluating that environment image. In some embodiments, evaluating an environment image means within a timespan (e.g., a pre-determined timespan) such that it is unlikely that it would become unsafe to execute CMM operations, which timespan is measured from the generation of the environment image. Such timespans may be determined by the operator or owner of the CMM. In preferred embodiments, that timespan is within one minute, within 2 minutes, or within 5 minutes, to name but a few examples.

The term "CMM operations" means operations involving automatically moving movable parts of a coordinate measuring machine.

The "environment" of a machine (including without limitation a robot; a coordinate measuring machine) includes the machine and the space immediately around the machine. Without limitation, the "environment" of a robot includes the robot's "operational volume." For example, without limitation the "environment" of a coordinate measurement machine may include the measurement space of the coordinate measuring machine.

The term "inactive mode" in reference to a machine (including, without limitation, a robot) means that the machine is fully functional (and in some embodiments may also be under power), but is not moving its movable parts or executing a program that includes moving its movable parts. For example, but without limiting the definition, in an "inactive mode" the machine is not (a) executing inspection operations, such as moving a sensor (e.g., a probe) to inspect a workpiece, or (b) imaging a workpiece to identify the workpiece or to orient the workpiece to the coordinate measuring machine, or (c) changing a probe, or (d) starting-up, or (e) being programmed or undergoing programming, or (f) moving a workpiece, or (g) operating on a workpiece, or (h) executing CMM operations.

A "moving part" of a machine is a part of the machine, which part moves during normal operation of the machine. For example, an industrial robot typically has an arm, and the arm of the industrial robot is a moving part when the industrial robot is, for example, in normal production operation. A coordinate measuring machine is a machine that typically has at least one moving part.

A moving part of a machine presents a risk of injury to a person, or damage to an object, which person or object is within the range of motion of the moving part, or to the machine itself. Although some moving parts are closed within internal spaces of the machine, or shielded from space external to the machine by a barrier or shielding, other moving parts are typically exposed to space external to the machine during normal operation of the machine. The risk of injury to a person, or damage to an object that is not part of the machine, and in some machines even damage to a part of the machine itself, is greater when the moving part of a machine is an "unshielded" moving part.

The term "near" with regard to proximity of an object to a moving part of a machine means within the range of motion of the moving part of the machine, such that motion of the moving part within its normal range of motion could physically contact the object. In some embodiments, the term "near" may also include a buffer zone extending beyond the normal range of motion of the moving part. Such a buffer zone may be, for example, 25 cm, 50 cm, or 1 m, or more at the discretion of the system designer or system operator. In some embodiments, the term "near" may be defined as a specified distance between an object and a moving part. The specified distance may be, for example, 25 cm, 50 cm, or 1 m, or more at the discretion of the system designer or system operator.

The term "non-production activity" (and its plural: "non-production activities") with regard to a coordinate measuring machine means activities not part of measurement by the coordinate measuring machine of a workpiece. Non-production activities include, for example and without limitation, repairing the CMM; and/or calibrating the CMM, to name but a few examples. The term "non-production activity" also includes changing a probe of the coordinate measuring machine other than as part of executing a set of measurement operations.

The term "operational volume," with regard to a machine (e.g., a robot; or coordinate measuring machine) means the physical space in which the movable parts of the machine can move. With regard to a coordinate measuring machine, the "operational volume" of the coordinate measuring machine 200 includes the physical space that is within the range of motion of a moving part 220 of the coordinate measuring machine. The operational volume of a coordinate measuring machine includes at least a portion of its measurement space 213.

A "set" includes at least one member.

An "unshielded moving part" is a moving part of a machine, which part is directly accessible from space external to the machine during operation of the machine, without shielding or other structure between the moving part and the space external to the machine. For example, the arm of an industrial robot may be an "unshielded" moving part. As another example, at least some moving parts 220 of a coordinate measuring machine 200 are "unshielded" moving parts.

The term "wide-angle" with regard to a camera means that the camera's field of view covers an angle of 64°, and in some embodiments between 64° and 84°.

Figure 1:
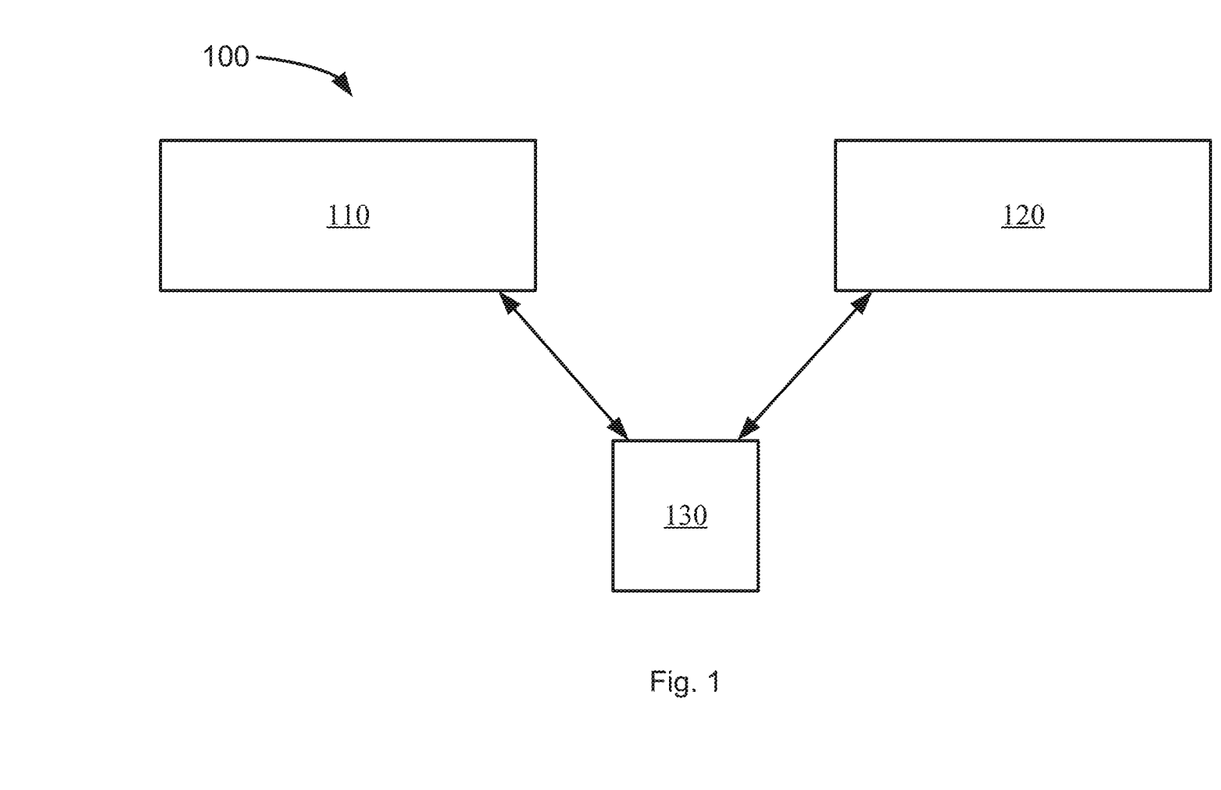
FIG. 1 schematically illustrates an embodiment of a facility employing a coordinate measuring machine.

FIG. 1 schematically illustrates an embodiment of a facility 100 employing machinery 130 having moving parts, and/or unshielded moving parts. The machinery 130 may be, for example, a robot (e.g., with a robotic arm), a lathe, a computer numerical control machine (i.e., a "CNC" machine), a conveyor system or other material handling system, and/or a coordinate measuring machine 200, to name but a few examples. Illustrative examples described below employ a coordinate measuring machine 200 as a machine with movable parts (and typically with unshielded moving parts), but those examples do not limit the disclosure of or application of inventive concepts to use with coordinate measuring machines.

In FIG. 1, the facility 100 may include machinery and equipment 110 for producing workpieces, and apparatuses 120 for storing workpieces. For example, machinery and equipment 110 may produce a workpiece from raw material, and provide the workpiece to an apparatus 120 for storing the workpiece. After production of a workpiece, or at stages during the production of a workpiece, the workpiece may be provided from the machinery and equipment 110 to a machine 130, such as a coordinate measuring machine 200 for inspecting the workpiece. The coordinate measuring machine 200 may be in a quality assurance lab, in which a subset of samples of workpieces are inspected, or may be in a production environment to inspect each workpiece produced, to describe but a few examples.

Figure 2A:
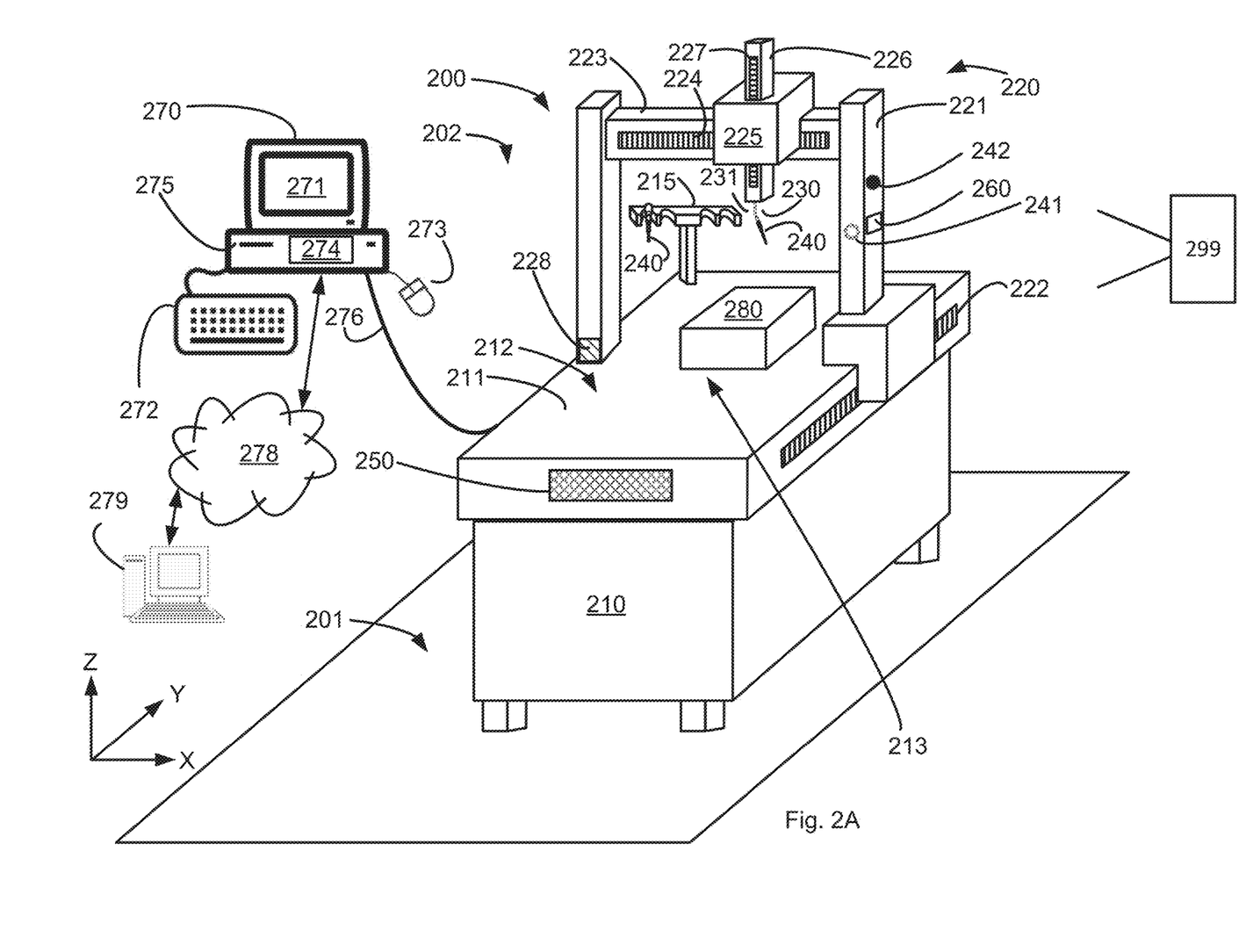
FIG. 2A schematically illustrates an embodiment of a coordinate measuring machine.
Figure 2B:
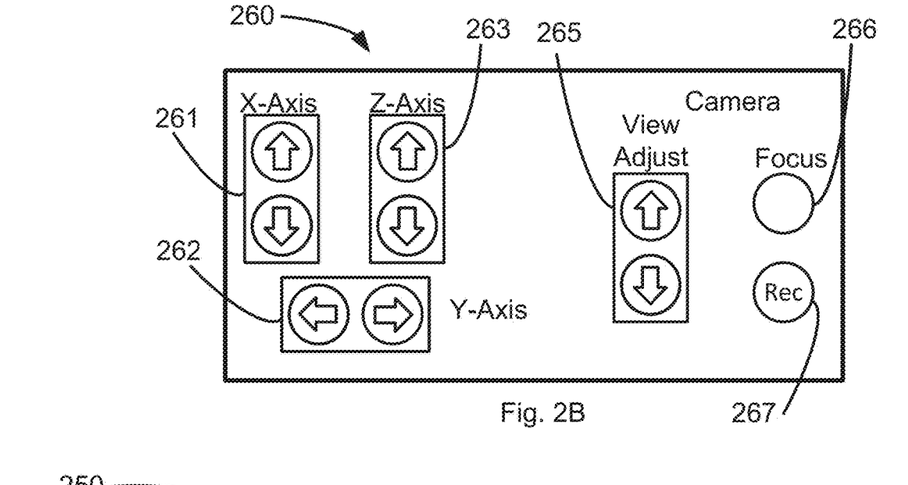
FIG. 2B schematically illustrates an embodiment of a manual user interface of a coordinate measuring machine.
Figure 2C:
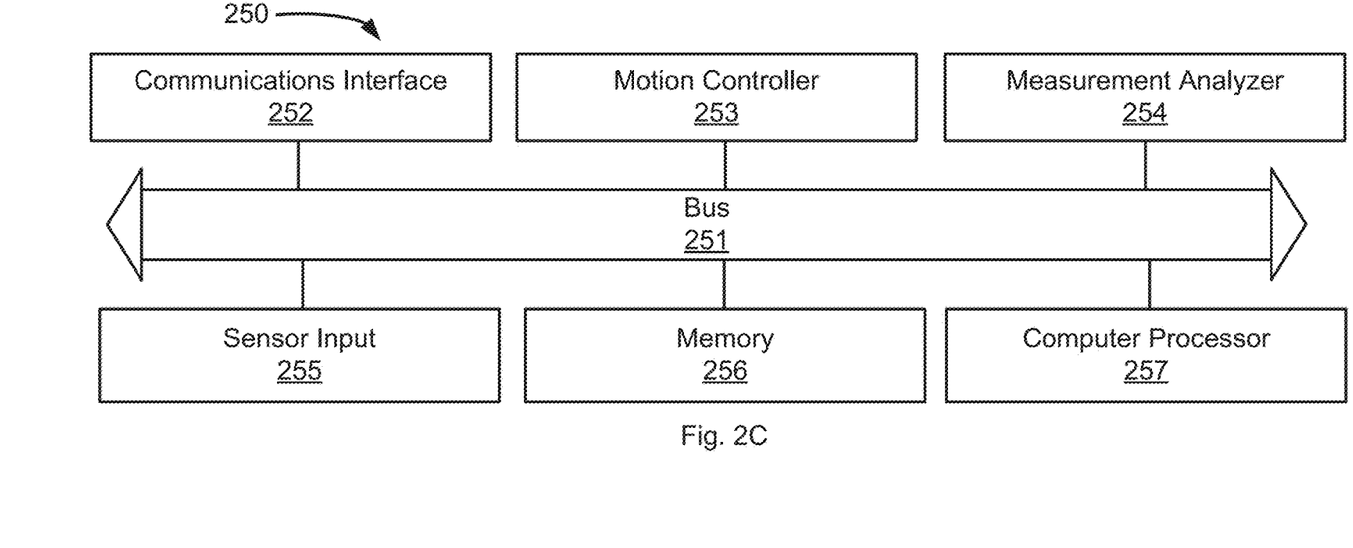
FIG. 2C schematically illustrates an embodiment of a control system of a coordinate measuring machine.

FIGS. 2A-2C schematically illustrate a coordinate measurement machine 200 ("CMM 200") that may be configured in accordance with illustrative embodiments.

As known by those in the art, a coordinate measuring machine is a system configured to measure one or more features of a workpiece 280.

Typically, a workpiece 280 has a specified shape with specified dimensions, which may be referred-to collectively as the "geometry" of the workpiece 280.

CMM Base

In the illustrative embodiment of FIG. 2A, the CMM 200 includes a base 210 having a table 211. The table 211 of the CMM 200 defines an X-Y plane 212 that typically is parallel to the plane of the floor 201, and a Z-axis normal to the X-Y plane, and a corresponding X-Z plane and Y-Z plane. The table 211 also defines a boundary of a measurement space 213 above the table 211. In some embodiments, the CMM 200 includes a probe rack 215 configured to hold one or more measuring sensors 240. A moveable part of the CMM 200 may move to the probe rack 215 and place a measuring sensor 240 into the probe rack 215, and/or remove another measuring sensor 240 from the probe rack 215.

Moveable Parts

The CMM 200 also has movable features (collectively, 220) arranged to move and orient a measuring sensor (e.g., a "probe") 240 (and in some embodiments, a plurality of such devices) relative to the workpiece 280. As described below, movable features of the CMM 200 are configured to move and orient the measuring sensor 240, relative to the workpiece 280, in one dimension (X-axis; Y-axis; or Z-axis), two dimensions (X-Y plane; X-Z plane; or Y-Z plane), or three dimensions (a volume defined by the X-axis, Y-axis, and Z-axis). Accordingly, the CMM 200 is configured to measure the location of one or more features of the workpiece 280.

The CMM 200 of FIG. 2A is known as a "bridge" CMM. Movable features 220 of the bridge CMM 200 include a bridge 223 movably coupled to the base 210 by legs 221. The bridge 223 and legs 221 are controllably movable relative to the base 210 along the Y-axis.

To facilitate motion of the legs relative to the base 210, the legs 221 may be coupled to the base 210 by one or bearings 228. As known in the art, a bearing may be a roller bearing or an air bearing, to name but a few examples.

The movable features also include a carriage 225 movably coupled to the bridge 223. The carriage is configured to controllably move in the X-axis along the bridge 223. The position of the carriage 225 along the bridge 223 may be determined by a bridge scale 224 operably coupled to the bridge 223.

A spindle 226 is moveably coupled to the carriage 225. The spindle 226 is configured to controllably move in the Z-axis. The position in the Z-axis of the spindle 226 may be determined by a spindle scale 227 operably coupled to the spindle 226. The measuring sensor 240 is operably coupled to the spindle 226. Consequently, the measuring sensor 240 is controllably movable in three dimensions relative to a workpiece 280 in the measurement space 213.

In some embodiments, the measuring sensor 240 is moveably coupled to the spindle 226 by an articulated arm 230. For example, the measuring sensor 240 may be movably coupled to the arm 230 by a movable joint 231. The moveable joint 231 allows the orientation of the measuring sensor 240 to be controllably adjusted relative to the arm 230, to provide to the measuring sensor 240 additional degrees of freedom in the X-axis, Y-axis, and/or Z-axis.

In other embodiments, which may be generally referred-to as "gantry" CMMs, the legs 221 stand on the floor 201, and the measurement space 213 is defined relative to the floor 201.

In yet other embodiments, the measuring sensor 240 is fixed to (i.e., not movable relative to) the base 210, and the table 211 is movable in one, two or three dimensions relative to the measuring sensor 240. In some coordinate measuring machines, the table 211 may also be rotatable in the X-Y plane. In such embodiments, the CMM 200 moves the workpiece 280 relative to the measuring sensor.

In other embodiments, which may be generally referred-to as "horizontal arm" CMMs, the bridge 223 is movably coupled to the base 210 to extend in the Z-axis, and to be controllably movable along the Y-axis. In such a CMM, the arm 230 is controllably extendable in the X-axis, and controllably movable up and down the bridge 223 in the Z-axis.

In yet other embodiments, the arm 230 is articulated. One end of the arm 230 is fixed to the base 210, and a distal end of the arm 230 is movable relative to the base 210 in one, two or three dimensions relative to a workpiece 280 in the measurement space 213.

Sensors

In some embodiments, the measuring sensor 240 may be a tactile probe (configured to detect the location of a point on the workpiece 280 by contacting a probe tip to the workpiece 280, as known in the art), a non-contact probe (configured to detect the location of a point on the workpiece 280 without physically contacting the workpiece 280), such as a capacitive probe or an inductive probe as known in the art, or an optical probe (configured to optically detect the location of a point on the workpiece 280), to name but a few examples.

In some embodiments, the measuring sensor 240 is a vision sensor that "sees" the workpiece 280. Such a vision sensor may be a camera capable of focusing on the workpiece 280, or the measurement space 213, and configured to capture and record still images or video images. Such images, and/or pixels within such images, may be analyzed to locate the workpiece 280; determine the placement and/or orientation of the workpiece 280; identify the workpiece 280; and/or measure the workpiece 280, to name but a few examples.

Some embodiments of a CMM 200 may include one, or more than one, camera 241 configured such that the measurement space 213 is within the field of view of the camera 241. Such a camera 241 may be in addition to a measuring sensor 240. The camera 241 may be a digital camera configured to capture still images and/or video images of the measurement space 213, a workpiece 280 on the CMM 200, and/or the environment 202 in the immediate vicinity of the CMM 200. Such images may be color images, black and white images, and/or grayscale image, and the camera 241 may output such images as digital data, discrete pixels, or in analog form.

Some embodiments of a CMM 200 may also include an environmental sensor 242 configured to measure one or more characteristics of the environment 202 in which the CMM is placed, and some embodiments may have more than one such environmental sensor 242. For example, an environmental sensor 242 may be configured to measure the temperature, pressure, or chemical content of the environment 202 around the CMM 200. An environmental sensor 242 may also be s motion sensor, such as an accelerometer or a gyroscope, configured to measure vibrations of the CMM caused, for example, the by motion of people or objects near the CMM 200. An environmental sensor 242 may also be a light detector configured to measure ambient light in the environment 202, which ambient light might, for example, interfere with the operation of an optical sensor or vision sensor. In yet another embodiment, an environmental sensor 242 may be sound sensor, such as a microphone, configured to detect sound energy in the environment.

In operation, the CMM 200 measures the workpiece 280 by moving the measuring sensor 240 relative to the workpiece 280 to measure the workpiece 280.

Control System

Some embodiments of a CMM 200 include a control system 250 (or "controller" or "control logic") configured to control the CMM 200, and process data acquired by the CMM. FIG. 2C schematically illustrates an embodiment of a control system 250 having several modules in electronic communication over a bus 251.

In general, some or all of the modules may be implemented in one or more integrated circuits, such as an ASIC, a gate array, a microcontroller, or a custom circuit, and at least some of the modules may be implemented in non-transient computer-implemented code capable of being executed on a computer processor 257.

Some embodiments include a computer processor 257, which may be a microprocessor as available from Intel Corporation, or an implementation of a processor core, such as an ARM core, to name but a few examples. The computer processor 257 may have on-board, non-transient digital memory (e.g., RAM or ROM) for storing data and/or computer code, including non-transient instructions for implementing some or all of the control system operations and methods. Alternately, or in addition, the computer processor 257 may be operably coupled to other non-transient digital memory, such as RAM or ROM, or a programmable non-transient memory circuit for storing such computer code and/or control data. Consequently, some or all of the functions of the controller 250 may be implemented in software configured to execute on the computer processor.

The control system 250 includes a communications interface 252 configured to communicate with other parts of the CMM 200, or with external devices, such as computer 270 via communications link 276. To that end, communications interface 252 may include various communications interfaces, such as an Ethernet connection, a USB port, or a Firewire port, to name but a few examples.

The control system 250 also includes a sensor input 255 operably coupled to one or more sensors, such as a measuring sensor 240 or camera 241. The sensor input 255 is configured to receive electronic signals from sensors, and in some embodiments to digitize such signals, using a digital to analog ("D/A") converter. The sensor input 255 is coupled to other modules of the control system 250 to provide to such other modules the (digitized) signals received from sensors.

The motion controller 253 is configured to cause motion of one or more of the movable features of the CMM 200. For example, under control of the computer processor 257, the motion controller 253 may send electrical control signals to one or more motors within the CMM 200 to cause one or more movable features of the CMM 200 to move a measuring sensor 240 to various points within the measurement space 213 and take measurements of the workpiece 280 at such points. The motion controller 253 may control such motion in response to a measurement program stored in memory module 256, or stored in computer 270, or in response to manual control by an operator using manual user interface 260, to name but a few examples.

Measurements taken by the CMM 200 may be stored in a memory module 256, which includes a non-transient memory. The memory module 256 is also configured to store, for example, a specification for a workpiece 280 to be measured; a specification for a calibration artifact; an error map; and non-transient instructions executable on the computer processor 257, to name but a few examples. Such instructions may include, among other things, instructions for controlling the moveable features of the CMM 200 for measuring a workpiece 280 and/or a calibration artifact; instructions for analyzing measurement data; and instructions for correcting measurement data (e.g., with an error map).

The measurement analyzer 254 is configured to process measurement data received from one or more sensors, such as measuring sensor 240. In some embodiments, the measurement analyzer 254 may revise the measurement data, for example by modifying the measurement data using an error map, and/or compare the measurement data to a specification, for example to assess deviation between a workpiece 280 and a specification for that workpiece 280. To that end, the measurement analyzer 254 may be a programmed digital signal processor integrated circuit, as known in the art.

Alternately, or in addition, some embodiments couple the CMM 200 with an external computer (or "host computer") 270. In a manner similar to the control system 250, the host computer 270 has a computer processor such as those described above, and non-transient computer memory 274, in communication with the processor of the CMM 200. The memory 274 is configured to hold non-transient computer instructions capable of being executed by the processor, and/or to store non-transient data, such as data acquired as a result of the measurements of an object 280 on the base 210.

Among other things, the host computer 270 may be a desktop computer, a tower computer, or a laptop computer, such as those available from Dell Inc., or even a tablet computer, such as the iPad™ available from Apple Inc. In addition to the computer memory 274, the host computer 270 may include a memory interface 275, such as a USB port or slot for a memory card configured to couple with a non-transient computer readable medium and enable transfer of computer code or data, etc. between the computer 270 and the computer readable medium.

The communication link 276 between the CMM 200 and the host computer 270 may be a hardwired connection, such as an Ethernet cable, or a wireless link, such as a Bluetooth link or a Wi-Fi link. The host computer 270 may, for example, include software to control the CMM 200 during use or calibration, and/or may include software configured to process data acquired during operation of the CMM 200. In addition, the host computer 270 may include a user interface configured to allow a user to manually operate the CMM 200. In some embodiments, the CMM and/or the host computer 270 may be coupled to one or more other computers, such as server 279, via a network 278. The network 278 may be a local area network, or the Internet, to name but two examples.

In some embodiments, the host computer 270 and/or the server 279 may be in operable communication with the sensor array 299. In such embodiments, the host computer 270 and/or the server 279 may control the sensor array 299 to acquire a set of images of the environment 202, and/or may receive from the sensor array 299 images of the environment.

Because their relative positions are determined by the action of the movable features of the CMM 200, the CMM 200 may be considered as having knowledge of the relative locations of the base 210, and the workpiece 280. More particularly, the computer processor 257 and/or computer 270 control and store information about the motions of the movable features. Alternately, or in addition, the movable features of some embodiments include sensors that sense the locations of the table 211 and/or measuring sensor 240, and report that data to the computer 270 or controller 250. The information about the motion and positions of the table and/or measuring sensor 240 of the CMM 200 may be recorded in terms of a one-dimensional (e.g., X, Y Z), two-dimensional (e.g., X-Y; X-Z; Y-Z) or three-dimensional (X-Y-Z) coordinate system referenced to a point on the CMM 200.

Manual User Interface

Some CMMs also include a manual user interface 260. An embodiment of a manual user interface 260 is schematically illustrated in FIG. 2B. As shown, the manual user interface 260 may have controls (e.g., buttons; knobs, etc.) that allow a user to manually operate the CMM 200. Among other things, the interface 260 may include controls that enable the user to change the position of the measuring sensor 240 relative to the workpiece 280. For example, a user can move the measuring sensor 240 in the X-axis using controls 261, in the Y-axis using controls 262, and/or in the Z-axis using controls 263.

If the measuring sensor 240 is a vision sensor, or if the CMM 200 includes a camera 241, then the user can manually move the sensor 240, camera 241, or change field of view of the vision sensor and/or camera using controls 265. The user may also focus the vision sensor and/or camera 241 using control 266 (which may be a turnable knob in some embodiments) and capture and image, or control recording of video, using control 267.

As such, the movable features may respond to manual control, or be under control of the computer processor 257, to move the base 210 and/or the measuring sensor 240 relative to one another. Accordingly, this arrangement permits the object being measured to be presented to the measuring sensor 240 from a variety of angles, and in a variety of positions.

Calibration

Typically, a CMM 200 is calibrated and recalibrated from time to time. Generally, calibration may be described as taking remedial action to compensate for any differences between a CMM 200 and a specification of the CMM 200 and its operation. For example, calibration may include assessing one or more measures of the accuracy of a CMM 200, and taking remedial action to change the CMM 200 or its operation.

The manufacturer of a CMM 200 may specify that the CMM 200 be calibrated at certain time intervals. Alternately, or in addition, the operator of the CMM 200 may calibrate the CMM 200 in response to a change of location, a change of environment (e.g., temperature; pressure, etc.), a change to the machine (e.g., replacing, or changing the type of, a measuring sensor 240), and/or a change of a programmed measuring process, to name but a few examples.

Typically, calibrating a CMM 200 includes using the CMM 200 to measure a calibrated artifact, which is essentially a workpiece having known, highly-accurate dimensions, and comparing the measurements taken by the CMM 200 against those dimensions. A difference between the measurements taken by the CMM 200 and the known dimensions represents an inaccuracy.

To mitigate any such inaccuracy, a technician may adjust a portion of the CMM 200, including one or more of its moveable features, so that the inaccuracy is reduced or eliminated. Alternately, or in addition, subsequent measurement data produced by the CMM 200 may be mathematically adjusted in ways known in the art, to counteract the inaccuracy.

Illustrative embodiments of a CMM system include an array of sensors 299. The array of sensors 299 has a field of view, and is disposed relative to the CMM 200 such that at least a portion of the CMM 200, or the environment 202 around the CMM 200, is within the field of view. In preferred embodiments, at least the measurement volume 213 of the CMM 200 is within the field of view. In other embodiments, the entire CMM 200 (including the measurement volume 213) is within the field of view.

The array of sensors 299 includes at least one sensor, and in some embodiments includes a plurality of sensors. For example, in some embodiments the array of sensors 299 includes at least one still photography camera having a field of view. The still photography camera captures an image of the portion of the CMM system that is within the camera's field of view.

In other embodiments, the array of sensors 299 includes at least one video camera having a field of view. The video camera captures video of the portion of the CMM system that is within the video camera's field of view.

In other embodiments, the array of sensors 299 includes at least one acoustic sensor (e.g., an ultrasonic sensor) having a field of view. The acoustic sensor captures a sonic image (e.g., a sonogram) of the portion of the CMM system that is within the acoustic sensor's field of view.

In other embodiments, the array of sensors 299 includes at least one motion detector having a field of view. The motion detector captures a motion image (e.g., a set of motions detected) around the portion of the CMM system that is within the motion detector's field of view.

Figure 3:
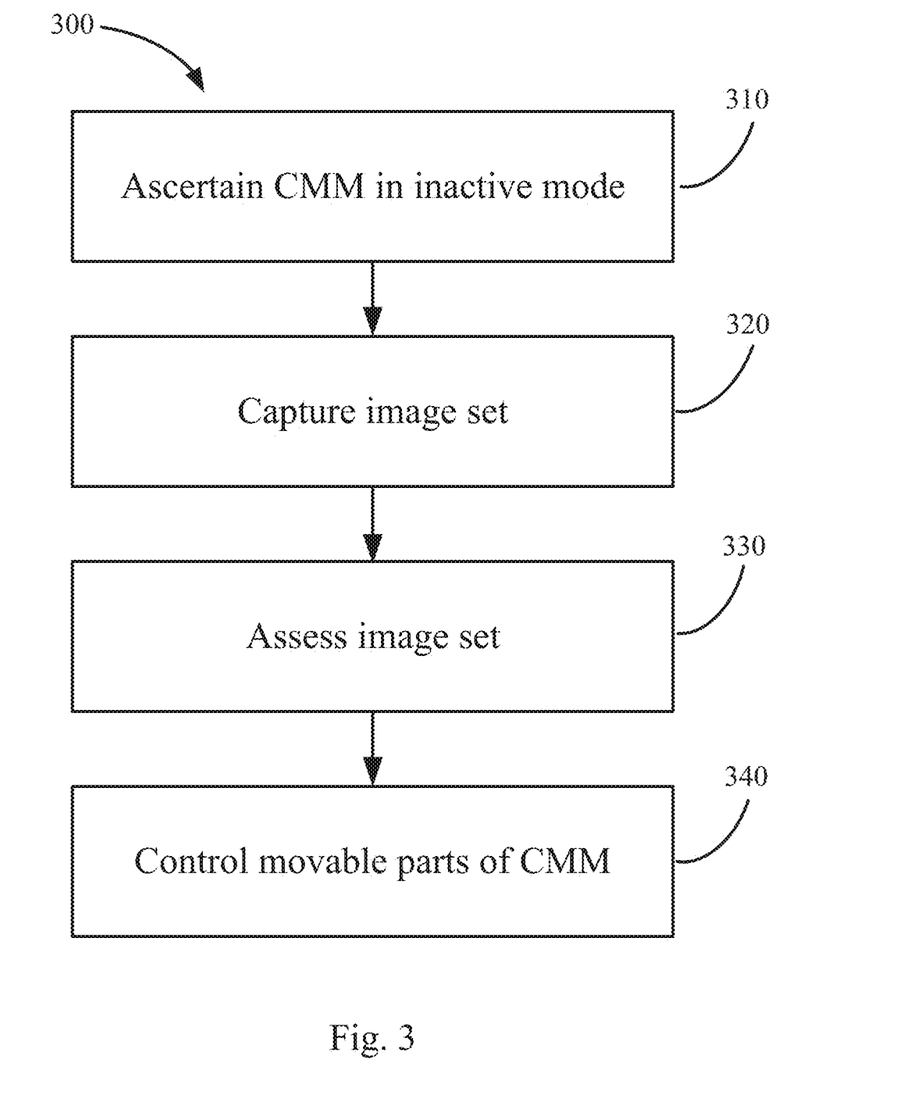
FIG. 3 is a flowchart describing an embodiment of a method of operating a machine, such as a coordinate measuring machine.

FIG. 3 is a flowchart of a method of operating a machine. For purposes of illustration, the machine in this illustrative embodiment is a coordinate measuring machine 200, but the method is not limited to coordinate measuring machines.

Step 310 establishes or ascertains that the machine (e.g., CMM 200) in an inactive mode. In some embodiments, establishing the CMM 200 in an inactive mode includes stopping motion by the movable features 220 of the CMM. In some embodiments, establishing the CMM 200 in an inactive mode includes preventing the moveable features from moving, for example by disabling such motion at the CMM controller 250 or computer 271. In some embodiments, establishing the CMM 200 in an inactive mode includes receiving, such as from a CMM operator, a signal that indicates that the CMM 200 is in an inactive mode, such as when the CMM operator has completed his or her use of the CMM 200.

Step 320 includes capturing an image set using the sensor array 299. In some embodiments, where the CMM 200 includes a camera 241, the CMM camera 241 may be considered to be, and may be used as, part or all of the sensor array 299 to capture an image set. In other embodiments where the CMM 200 includes a camera 241, of the sensor array 299 does not include that camera 241. The image set may be referred-to as a set (or "first set") of environment images, and in some embodiments step 320 may be described as imaging the environment using a camera to produce a first set of environment images, the camera having a field of view.

Step 330 includes determining whether there is at least one obstruction in the CMM environment, which CMM environment is within the field of view of the sensor array 299. In illustrative embodiments, determining whether there is one or more obstructions in the CMM environment, which CMM environment is within the field of view of the sensor array 299, is performed at least in part by analyzing an image set from the sensor array 299. Alternatively, in some embodiments, step 330 may be described as ascertaining, at least in part from the first set of environment images, that there is no obstruction within the environment within the camera's field of view.

Examples of obstructions include an object on the CMM's table 211 or within the CMM's measuring space 213, or a person on the floor 201 adjacent to the CMM 200. Generally, an obstruction is a physical object that could physically impact, or be impacted by, a movable feature 220 of the CMM 200 when such movable feature 220 moves relative to the CMM table 211 or measurement space 213. In illustrative embodiments, a workpiece 280 is considered to be an obstruction, as schematically illustrated in FIG. 4B, for example. In illustrative embodiments, a person 481 standing near a CMM 200 is considered an obstruction, as schematically illustrated in FIG. 4C, for example.

Some embodiments may determine (for example, by analysis of the image set by the computer 271 or controller 250) that autonomous (and in some embodiments, unattended) movement of a movable feature 220 of the CMM 200 is "safe" by determining that there is no obstruction in the CMM environment 202 within the field of view of the sensor array 299. In other words, in such embodiments, "safe" means that there is no such obstruction in the CMM environment 202 that would be damaged by movement of a moveable feature of the CMM 200, or that would damage CMM 200 if contact between CMM and obstruction is made.

Analyzing an image set from the sensor array 299 to determine whether the image set includes an image of an obstruction within the field of view of the sensor array includes comparing an image set to a previous image set of the same area, and identifying as an obstruction an object that is in the image set but not in the previous image set.

In some embodiments, such a comparison is performed by comparing all or a portion of an image to all or a corresponding portion of a previous image. For example, such a comparison may be performed via a pixel-by-pixel comparison of an image set to a previous image set.

Some embodiments assess an image set using a neural network, which neural network has been trained to determine whether an image includes an obstruction on a coordinate measuring machine. Some embodiments assess an image set using a neural network, which neural network has been trained to determine whether an image includes a human within the environment of the coordinate measuring machine. Some embodiments assess an image set using a neural network, which neural network has been trained to determine whether an image includes a foreign object within the environment of the coordinate measuring machine, wherein a foreign object is an object other than a workpiece on the coordinate measuring machine or a human, which object is not part of the coordinate measuring machine or which is not normally within the environment of the coordinate measuring machine.

There are several benefits to using such a trained neural network to assess an image from an image set. For example, the inventors have found that a trained neural network is better able to detect the presence, in such an image, of an obstruction (e.g., an object or human on or near a coordinate measuring machine 200) consistently and objectively, relative to human assessment of such an image.

Such a neural network may be trained using a plurality of training datasets, each of which has a plurality of data items, and a corresponding results vector. In illustrative embodiments, the neural network, prior to training, is unweighted (or blank) in that the weights between the nodes are all equal. In illustrative embodiments, the neural network, once trained, is static in that it does not change or evolve when used. In other embodiments, the neural network may continue to learn and evolve with use.

Figure 4A:
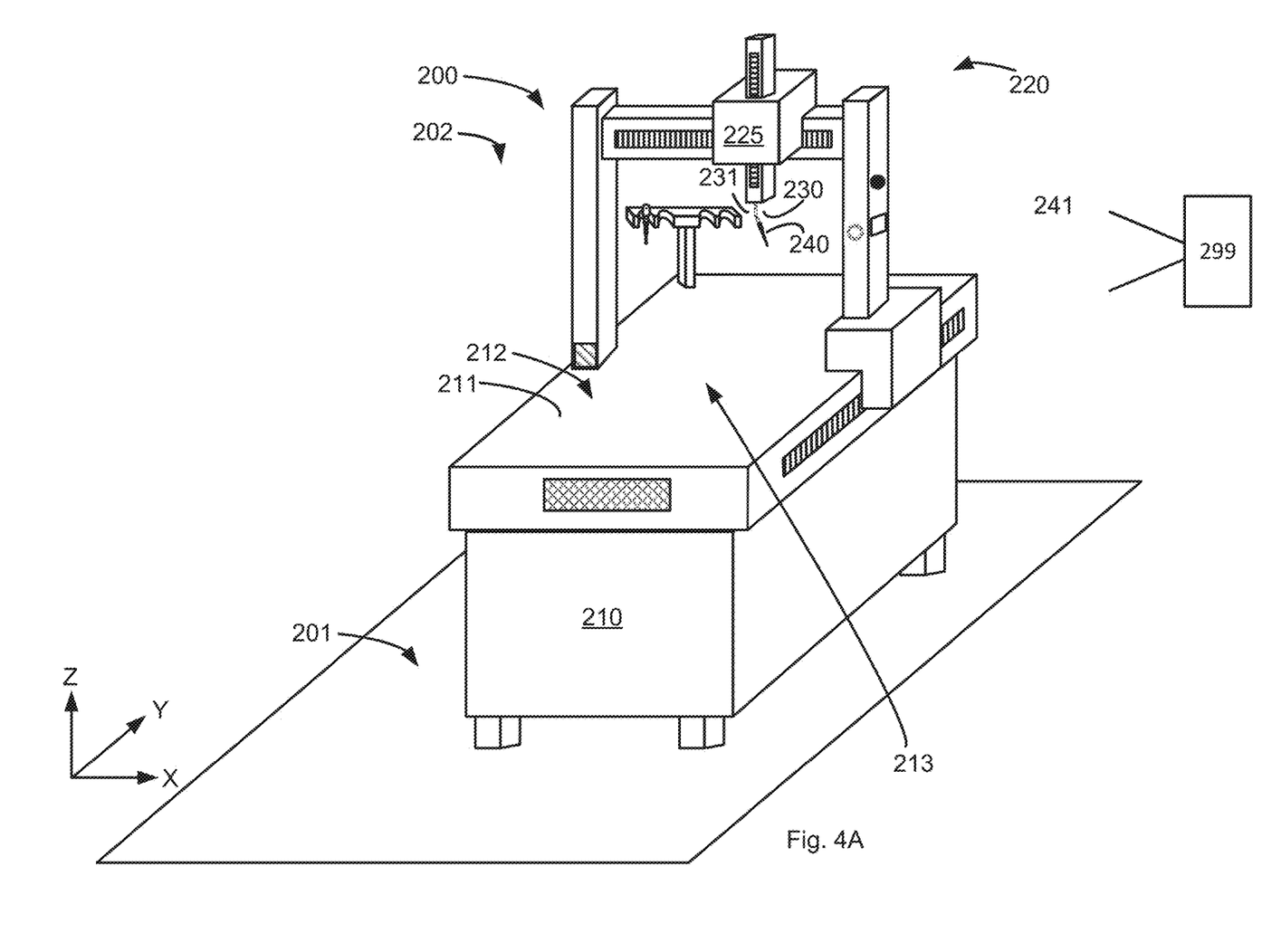
FIG. 4A schematically illustrates an embodiment of a coordinate measuring machine without obstruction.
Figure 4B:
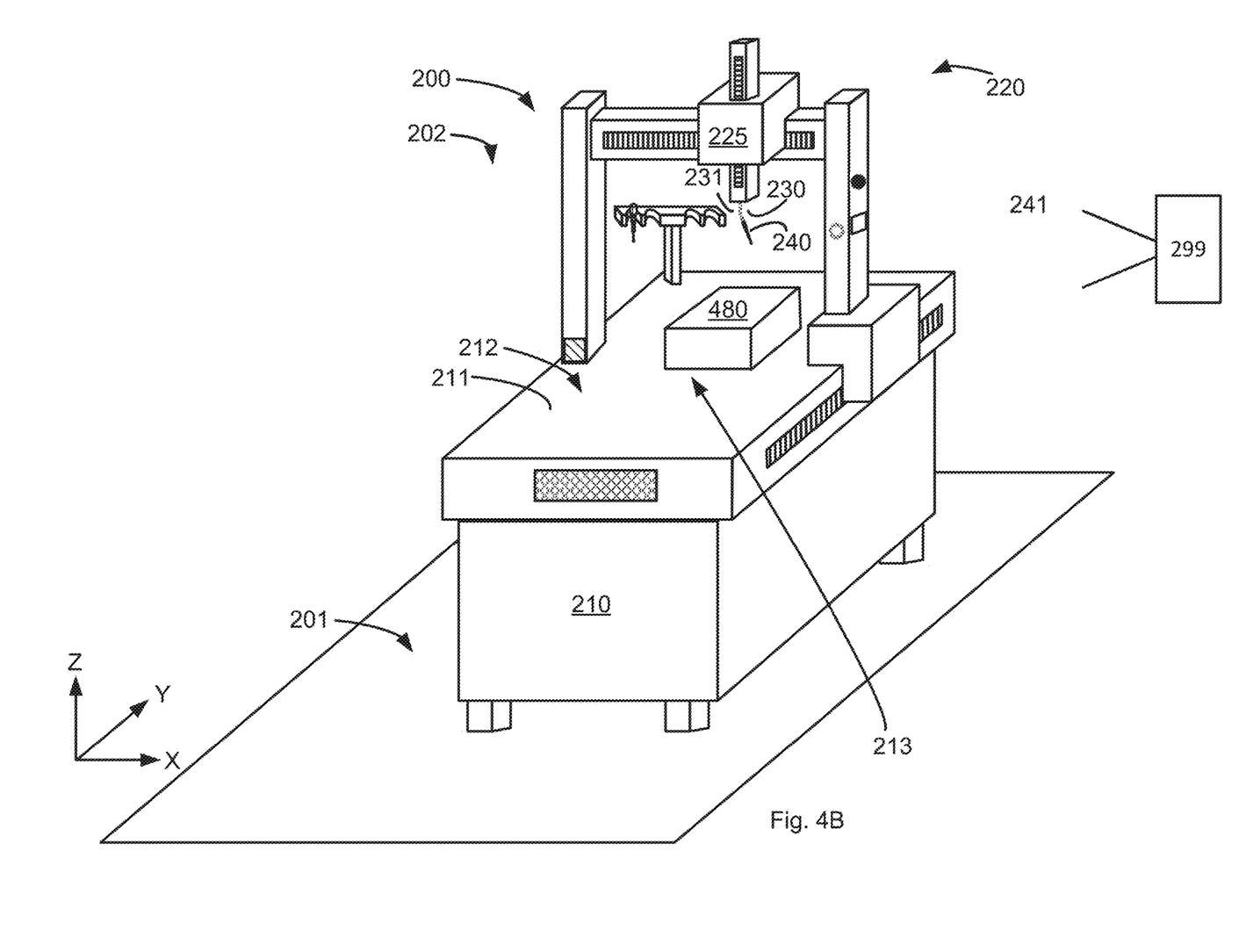
FIG. 4B schematically illustrates an embodiment of a coordinate measuring machine with an obstruction on the coordinate measuring machine.
Figure 4C:
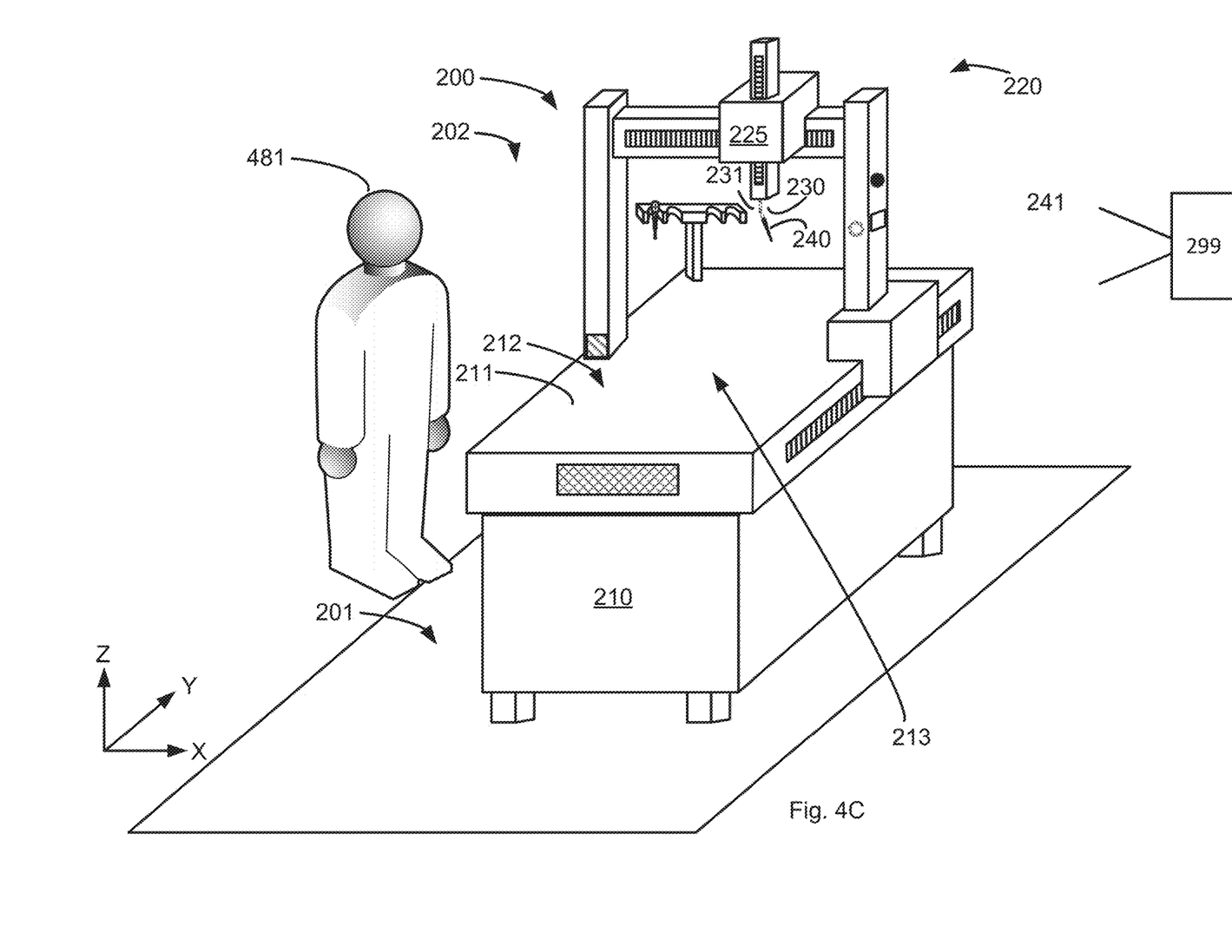
FIG. 4C schematically illustrates an embodiment of a coordinate measuring machine with a human in the environment.

Each training dataset includes a plurality of training images, and the results vector for each such training image indicates whether the image includes an obstruction. As noted herein, an obstruction may include one or more of a workpiece on the coordinate measuring machine, a physical object (other than a workpiece) on the coordinate measuring machine or in the environment of the coordinate measuring machine, such a human or other object, to name but a few examples. Examples of training images are schematically illustrated in FIG. 4A, FIG. 4B and FIG. 4C, and results vectors for those images are in the following table (Table 1):

| Training Image | Results Vector |
| --- | --- |
| FIG. 4A | No obstruction |
| FIG. 4B | Yes, there is an obstruction |
| FIG. 4C | Yes, there is an obstruction |

In illustrative embodiments, a training dataset includes many images of the coordinate measuring machine in which no obstruction is present. One example of such an image is schematically illustrated in FIG. 4A. The results vector for the image in FIG. 4A indicates that the image is free of (i.e., the image does not include) an obstruction.

The training dataset also includes many images of the coordinate measuring machine in which at least one obstruction is present. One example of such an image is schematically illustrated in FIG. 4B, in which an object 480 (e.g., a workpiece, a jogbox, or a non-workpiece object) is disposed on the coordinate measuring machine 200. The results vector for the image in FIG. 4B indicates that the image includes an obstruction.

Another example of such an image is schematically illustrated in FIG. 4C, in which a human 481 is disposed in the environment 481 near the coordinate measuring machine 200. The results vector for the image in FIG. 4C indicates that the image includes an obstruction.

In preferred embodiments, each image in the training dataset is an image is a specific coordinate measuring machine for which the neural network will be trained.

Training the neural network includes applying to the neural network a plurality (or group) of training datasets. In illustrative embodiments, training a neural network may include providing to the neural network 4500 distinct training datasets, but the number of distinct training datasets to produce train the neural network will depend on user requirements. Consequently, training a neural network may include providing to the neural network with more than 400 distinct training datasets, or fewer than 4000 distinct training sets, depending on the datasets and the accuracy required for the application of the neural network.

After training, the neural network is tested by applying one or more test datasets, each such test dataset including a set of environment images, and assessing whether the trained neural network correctly identifies an obstruction within each such environment image, or correctly determines that said environmental image does not include an obstruction.

The assessment of whether the trained neural network correctly identifies an obstruction within an environment image, or whether the trained neural network correctly determines that said environmental image does not include an obstruction, depends on user requirements accuracy in making such identifications or determinations, and such requirement can be made by the system's designer, implementor or system operator. If the trained neural network correctly identifies an obstruction within the environment image, or correctly determines that said environmental image does not include an obstruction then the training is complete, and otherwise the neural network undergoes additional training, with additional training datasets, until the neural network correctly identifies an obstruction within the environment images, and correctly determines that said environmental image does not include an obstruction.

When such an obstruction is detected, the method 300 loops back to step 310 to ascertain that the CMM 200 is in an inactive mode, and to render the CMM 200 into an inactive mode if the CMM 200 is not already in an inactive mode.

When no such obstruction is detected (e.g., when the system determines that it is safe to operate movable features 200 of the CMM 200), the process continues at step 340, in which the movable features 220 of the CMM 200 are caused to move, for example to execute automated non-production activities. In some embodiments, step 340 may be performed when the CMM 200 is not attended by, or monitored by, an operator or other human. Such operation may be referred-to as unattended operation.

Assessing Images with a Neural Network

A method of evaluating an environmental image with a neural network includes: (1) providing a trained neural network; (2) providing an environment image as input to the trained neural network; and (3) receiving output from the trained neural network, the output indicating a determination by the neural network of whether there is an obstruction in the image. In some embodiments, the act of providing a neural network includes providing a previously-trained neural network, and in some embodiments, the act of providing a neural network includes training a neural network, as described above.

A listing of certain reference numbers is presented below. The following is a list of reference numbers used herein:
100: Facility;
110: Production equipment;
120: Storage apparatus;
130: Machine with moveable parts;
200: Coordinate measuring machine;
201: Floor;
202: Environment;
210: Base;
211: Table;
212: Plane;
213: Measurement space (or envelope);
215: Probe rack;
220: Moveable features;
221: Bridge legs;
222: Table scale;
223: Bridge;
224: Bridge scale;
225: Carriage;
226: Spindle;
227: Spindle scale;
228: Bearing;
230: Arm;
231: Moveable joint;
232: Rotary encoder;
240: Measuring sensor;
241: Camera;
242: Environmental sensor;
250: Control system;
251: Bus;
252: Communications interface;
253: Motion Controller;
254: Measurement analyzer;
255: Sensor input;
256: Memory;
257: Computer processor;
260: Manual user interface;
261: X-axis controls;
262: Y-axis controls;
263: Z-axis controls;
265: Camera motion controls;
266: Camera focus control;
267: Camera record control;
270: Host computer;
271: Screen;
272: Keyboard;
273: Mouse;
274: Computer memory;
275: Memory interface/communications port;
276: Communication link;
278: Network;
279: Server;
299: Environment sensor;
480: Obstruction on CMM;
481: Person near CMM Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A robotic system comprising:
a robot having an operational volume and moveable features that are automatically movable within the operational volume, the robot defining a robot environment;
a sensor set having a field of view, the sensor set disposed relative to the robot such that the robot environment is within the sensor set's field of view;
a computer system controllably coupled to the sensor set, the computer system configured:

to receive a first robot image set from the sensor set showing the robot environment at a first time;

contemporaneously with receipt of the first robot image set, to automatically analyze the first robot image set to determine whether the robot environment includes an obstruction that would jeopardize safe autonomous operation of the robot; and to disable automatic movement of the moveable features of the robot pursuant to a determination that the robot environment includes an obstruction.

P2. The system of P1 wherein the sensor set comprises a camera, and the first robot image set includes a still photograph, the still photograph capturing at least a portion of the robot's operational volume.

P3. The system of any of P1-P2 wherein the sensor set comprises a camera, and the first robot image set includes a still photograph, the still photograph capturing at least a portion of the robot's operational volume, and the obstruction includes an apparatus disposed within the operational volume.

P4. The system of any of P1-P3 wherein the sensor set comprises a camera, and the first robot image set includes a still photograph, the still photograph capturing at least an area adjacent to the robot's operational volume.

P5. The system of any of P1-P4 wherein the sensor set comprises a camera, and the first robot image set includes a still photograph, the still photograph capturing at least an area adjacent to the robot's operational volume, and the obstruction includes a human disposed within the operational volume.

P6. The system of any of P1-P5 wherein the sensor set comprises a camera, and the first robot image set includes a still photograph, the still photograph capturing at least an area adjacent to the robot's operational volume, and the obstruction includes a second robot disposed within the operational volume.

P7. The system of P1 wherein the sensor set comprises an ultrasonic sensor array, and the first robot image includes a sonogram produced by the ultrasonic sensor array, the sonogram capturing at least the robot's operational volume.

P8. The system of any of P1-P7 wherein the sensor set is remote from, and not part of, the robot.

P9. The system of any of P1-P7 wherein the sensor set is part of the robot.

P10. The system of any of P9 wherein the sensor set is part of the robot's moveable features.

P11: The system of any of P1-P10 wherein the robot includes a controller that comprises computer system.

P12: The system of any of P1-P11 wherein the robot includes a controller that is separate from, and in control communication with, the computer system.

P13: The system of any of P1-P12 wherein the robot comprises a coordinate measuring machine.

P21: A method of operating a coordinate measuring machine disposed in an environment, the method comprising:

ascertaining that the coordinate measuring machine is in an inactive mode;

while the coordinate measuring machine in the inactive mode, imaging the environment using a camera to produce a first set of environment images, the camera having a field of view;

contemporaneously with producing the first set of environmental images, ascertaining, at least in part from the first set of environment images, that there is no obstruction within the environment within the camera's field of view; and subsequent to and consequent to said ascertaining:

controlling movable parts of the coordinate measuring machine to execute non-production activities.

P22. The method of P21, wherein imaging the environment comprises imaging at least the measuring space of the coordinate measuring machine and a portion of the environment around the coordinate measuring machine.

P23. The method of any of P21-P22, wherein ascertaining, at least in part from the first set of environment images, that there is no obstruction within the environment within the camera's field of view comprises ascertaining, by automated computer analysis of the first set of environmental images, that the environment does not include a human within a specified distance of the coordinate measuring machine.

P24. The method of any of P21-P23, wherein ascertaining, at least in part from the first set of environment images, that there is no obstruction within the environment within the camera's field of view comprises ascertaining, by automated computer analysis of the first set of environmental images, that there is no foreign object on the coordinate measuring machine.

P25. The method of any of P21-P24, wherein ascertaining, at least in part from the first set of environment images, that there is no obstruction within the environment within the camera's field of view comprises ascertaining, by automated computer analysis of the first set of environmental images, that there is no workpiece on the coordinate measuring machine.

P26. The method of any of P21-P25, wherein ascertaining, at least in part from the first set of environment images, that there is no obstruction within the environment within the camera's field of view comprises providing the first set of environmental images to a human operator, and ascertaining, by operator analysis of the first set of environmental images, that the environment does not include a human within a specified distance of the coordinate measuring machine.

P27. The method of any of P21-P26, wherein ascertaining, at least in part from the first set of environment images, that there is no obstruction within the environment within the camera's field of view comprises providing the first set of environment images to a human operator, and ascertaining, by operator analysis of the first set of environment images, that there is no foreign object on the coordinate measuring machine.

P28. The method of any of P21-P27, wherein ascertaining, at least in part from the first set of environment images, that there is no obstruction within the environment within the camera's field of view comprises providing the first set of environment images to a human operator, and ascertaining, by operator analysis of the first set of environment images, that there is no workpiece on the coordinate measuring machine.

P29. The method of any of P21-P28, wherein the camera is a wide-angle still-image camera.

P30. The method of any of P21-P29 further comprising, prior to imaging at least one of the coordinate measuring machine and the environment using a camera to produce a first set of environment images, establishing the coordinate measuring machine in the inactive mode.

P31. The method of any of P21-P30 wherein ascertaining that the coordinate measuring machine is in an inactive mode is performed without assessing the first set of environment images.

P32. The method of any of P21-P31 wherein ascertaining, at least in part from the first set of environment images, that there is no obstruction within the environment within the camera's field of view comprises assessing the first set of environment images with a neural network trained to determine whether an image includes an obstruction on a coordinate measuring machine.

P33. The method of any of P21-P32 wherein ascertaining, at least in part from the first set of environment images, that there is no obstruction within the environment within the camera's field of view comprises assessing the first set of environment images with a neural network trained to determine whether a person is within the environment of a coordinate measuring machine.

P34. The method of any of P21-P33 wherein controlling movable parts of the coordinate measuring machine to execute non-production activities includes an activity selected from controlling movable parts of the coordinate measuring machine to execute calibration operations, repairing the coordinate measuring machine, or changing a probe.

P45. A system comprising:
a coordinate measuring machine disposed in an environment;
a camera having a field of view, the camera disposed so that the environment is within the field of view;
a server in operable communication with the coordinate measuring machine and in operable communication with the camera, the server configured:
  to ascertain that the coordinate measuring machine is in an inactive mode;
  to receive from the camera a set of digital images of the environment;
  contemporaneously with receipt of the set of digital images, to ascertain, at least in part from the first set of environment images, that there is no obstruction within the environment within the camera's field of view; and subsequent to and consequent to said ascertaining
to control movable parts of the coordinate measuring machine to execute non-production activities.

P46. The system of P45, wherein the server is further configured to cause the camera to acquire the set of digital images.

P47. The system of any of P45-P46, wherein the camera disposed so that the coordinate measuring machine is within the field of view and at least one image from the set of digital images include the coordinate measuring machine.

P48. The system of any of P45-P47, wherein the server is further configured to ascertain that the coordinate measuring machine is in an inactive mode prior to receipt of the set of digital images.

P51. A non-transient computer programmed product having non-transient computer-executable instructions stored thereon, which computer-executable instructions when executed by a computer cause the computer to perform a method relating to a coordinate measurement machine, the method comprising:
  ascertaining that the coordinate measuring machine is in an inactive mode;
  while the coordinate measuring machine in the inactive mode, imaging the environment using a camera to produce a first set of environment images, the camera having a field of view;
  contemporaneously with producing the first set of environmental images, ascertaining, at least in part from the first set of environment images, that there is no obstruction within the environment within the camera's field of view; and subsequent to and consequent to said ascertaining:
  causing movable parts of the coordinate measuring machine to execute non-production activities.

P52. The non-transient computer programmed product of P51, wherein ascertaining, at least in part from the first set of environment images, that there is no obstruction within the environment within the camera's field of view, comprises ascertaining, by automated computer analysis of the first set of environmental images, that there is no workpiece on the coordinate measuring machine.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of operating a coordinate measuring machine disposed in an environment, the method comprising:
   ascertaining that the coordinate measuring machine is in an inactive mode;
   while the coordinate measuring machine in the inactive mode, imaging the environment using a camera to produce a first set of environment images, the camera having a field of view;
   contemporaneously with producing the first set of environmental images, ascertaining, at least in part from the first set of environment images, that there is no obstruction within the environment within the camera's field of view; and subsequent to and consequent to said ascertaining:
   controlling movable parts of the coordinate measuring machine to execute non-production activities.

2. The method of claim 1, wherein imaging the environment comprises imaging at least the measuring space of the coordinate measuring machine and a portion of the environment around the coordinate measuring machine.

3. The method of claim 1, wherein ascertaining, at least in part from the first set of environment images, that there is no obstruction within the environment within the camera's field of view comprises ascertaining, by automated computer analysis of the first set of environmental images, that the environment does not include a human within a specified distance of the coordinate measuring machine.

4. The method of claim 1, wherein ascertaining, at least in part from the first set of environment images, that there is no obstruction within the environment within the camera's field of view comprises ascertaining, by automated computer analysis of the first set of environmental images, that there is no foreign object on the coordinate measuring machine.

5. The method of claim 1, wherein ascertaining, at least in part from the first set of environment images, that there is no obstruction within the environment within the camera's field of view comprises ascertaining, by automated computer analysis of the first set of environmental images, that there is no workpiece on the coordinate measuring machine.

6. The method of claim 1, wherein ascertaining, at least in part from the first set of environment images, that there is no obstruction within the environment within the camera's field of view comprises providing the first set of environmental images to a human operator, and ascertaining, by operator analysis of the first set of environmental images, that the environment does not include a human within a specified distance of the coordinate measuring machine.

7. The method of claim 1, wherein ascertaining, at least in part from the first set of environment images, that there is no obstruction within the environment within the camera's field of view comprises providing the first set of environment images to a human operator, and ascertaining, by operator analysis of the first set of environmental images, that there is no foreign object on the coordinate measuring machine.

8. The method of claim 1, wherein ascertaining, at least in part from the first set of environment images, that there is no obstruction within the environment within the camera's field of view comprises providing the first set of environment images to a human operator, and ascertaining, by operator analysis of the first set of environmental images, that there is no workpiece on the coordinate measuring machine.

9. The method of claim 1, wherein the camera is a wide-angle still-image camera.

10. The method of claim 1 further comprising, prior to imaging at least one of the coordinate measuring machine and the environment using a camera to produce a first set of environment images, establishing the coordinate measuring machine in the inactive mode.

11. The method of claim 1 wherein ascertaining that the coordinate measuring machine is in an inactive mode is performed without assessing the first set of environment images.

12. The method of claim 1 wherein ascertaining, at least in part from the first set of environment images, that there is no obstruction within the environment within the camera's field of view comprises assessing the first set of environment images with a neural network trained to determine whether an image includes an obstruction on a coordinate measuring machine.

13. The method of claim 1 wherein ascertaining, at least in part from the first set of environment images, that there is no obstruction within the environment within the camera's field of view comprises assessing the first set of environment images with a neural network trained to determine whether a person is within the environment of a coordinate measuring machine.

14. The method of claim 1 wherein controlling movable parts of the coordinate measuring machine to execute non-production activities includes an activity selected from controlling movable parts of the coordinate measuring machine to execute calibration operations, repairing the coordinate measuring machine, or changing a probe.

15. A non-transient computer programmed product having non-transient computer-executable instructions stored thereon, which computer-executable instructions when executed by a computer cause the computer to perform a method relating to a coordinate measurement machine, the method comprising:
   ascertaining that the coordinate measuring machine is in an inactive mode;
   while the coordinate measuring machine in the inactive mode, imaging the environment using a camera to produce a first set of environment images, the camera having a field of view;
   contemporaneously with producing the first set of environmental images, ascertaining, at least in part from the first set of environment images, that there is no obstruction within the environment within the camera's field of view; and subsequent to and consequent to said ascertaining:
   causing movable parts of the coordinate measuring machine to execute non-production activities.

16. The non-transient computer programmed product of claim 15, wherein ascertaining, at least in part from the first set of environment images, that there is no obstruction within the environment within the camera's field of view, comprises ascertaining, by automated computer analysis of the first set of environmental images, that there is no workpiece on the coordinate measuring machine.

17. The non-transient computer programmed product of claim 15, wherein:
   ascertaining, at least in part from the first set of environment images, that there is no obstruction within the environment within the camera's field of view comprises:
   ascertaining, by automated computer analysis of the first set of environmental images, that the environment does not include a human within a specified distance of the coordinate measuring machine.

18. The non-transient computer programmed product of claim 15, wherein:
  ascertaining, at least in part from the first set of environment images, that there is no obstruction within the environment within the camera's field of view comprises:
  ascertaining, by automated computer analysis of the first set of environmental images, that there is no foreign object on the coordinate measuring machine.

19. The non-transient computer programmed product of claim 15, wherein:
  ascertaining that the coordinate measuring machine is in an inactive mode comprises:
  establishing the coordinate measuring machine in the inactive mode.

20. The non-transient computer programmed product of claim 15, wherein ascertaining that the coordinate measuring machine is in an inactive mode is performed without first assessing the first set of environment images.

* * * * *